United States Patent [19]

Buchroeder

[11] 4,249,205
[45] Feb. 3, 1981

[54] ASPHERIC PROJECTION LENS SYSTEM UTILIZING CONCAVE IMAGE

[75] Inventor: Richard A. Buchroeder, Tucson, Ariz.

[73] Assignee: Marvin P. Hodges, St. Petersburg, Fla.

[21] Appl. No.: 968,424

[22] Filed: Dec. 11, 1978

[51] Int. Cl.³ .................. H04N 9/31; H04N 5/74; G02B 3/04
[52] U.S. Cl. .................................. 358/60; 358/237; 350/443
[58] Field of Search ............... 358/60, 62, 64, 237, 358/238, 239, 250, 104, 98, 100; 350/189–192, 173, 174, 9, 122, 175 FS; 313/474, 477, 478; 353/39, 63, 81

[56] References Cited

U.S. PATENT DOCUMENTS

| | | | |
|---|---|---|---|
| 2,172,775 | 9/1939 | Schmidt-Ott et al. | 358/237 |
| 2,530,397 | 11/1950 | Merte | 350/189 |
| 2,884,833 | 5/1959 | Pohl | 313/474 |

FOREIGN PATENT DOCUMENTS

| | | | |
|---|---|---|---|
| 943577 | 3/1949 | France | 350/189 |
| 643938 | 9/1950 | United Kingdom | 350/189 |

OTHER PUBLICATIONS

Rumsey, "A 'Sky Lens' for an Auroral Spectrograph", *Optica Acta*, vol. 8, No. 1, Jan. 1961, pp. 17–19.

*Primary Examiner*—John C. Martin
*Attorney, Agent, or Firm*—Mason, Kolehmainen, Rathburn & Wyss

[57] ABSTRACT

An aspheric projection lens system utilizes a single element aspheric projection lens for projecting a concave image from a concave cathode ray tube face plate, or the like onto a suitable projection surface.

17 Claims, 2 Drawing Figures

ASPHERIC PROJECTION LENS SYSTEM UTILIZING CONCAVE IMAGE

BACKGROUND OF THE INVENTION

1. Field of the Invention

This invention relates generally to optical projection systems, and more particularly, to a simple lens system capable of high-quality performance that utilizes only a single element aspheric projection lens and appropriate coupling optics for projecting an image from one or more cathode ray tubes or the like having concave face plates onto a suitable projection screen.

2. Description of the Prior Art

Projection lens systems usable for projecting cathode ray tube images onto a suitable projection surface are known. Such systems are relatively complex and are generally catadioptric in configuration or use multiple lens elements in order to achieve the necessary transmission efficiency and resolution.

While the prior art systems do achieve satisfactory optical performance, the catadioptric systems and the multiple lens systems tend to be complex, expensive and bulky, particularly the catadioptric systems.

SUMMARY OF THE INVENTION

Accordingly, it is an object of the present invention to provide an improved projection lens system that overcomes many of the disadvantages of the prior art systems.

It is yet another object of the present invention to provide an improved projection lens that is much simpler and less expensive than the prior art projection lens systems.

It is still another object of the present invention to provide a projection lens system that utilizes only a single element objective lens.

In accordance with a preferred embodiment of the invention, a single element objective lens having hyperbolic aspheric surfaces is used in conjunction with three cathode ray tubes, each having a concave face plate optically coupled to the objective lens by means of a beam splitter. The curvature of the face plate is optimized for the system, and such optimization of the image shape greatly reduces the complexity of the resulting lens system, and permits high quality performance to be achieved with a single element thick objective lens having identical hyperbolic aspheric surfaces.

BRIEF DESCRIPTION OF THE DRAWING

These and other objects and advantages of the present invention will be readily understood upon consideration of the following detailed description and attached drawing wherein.

DETAILED DESCRIPTION OF THE PREFERRED EMBODIMENT

Figure 1:
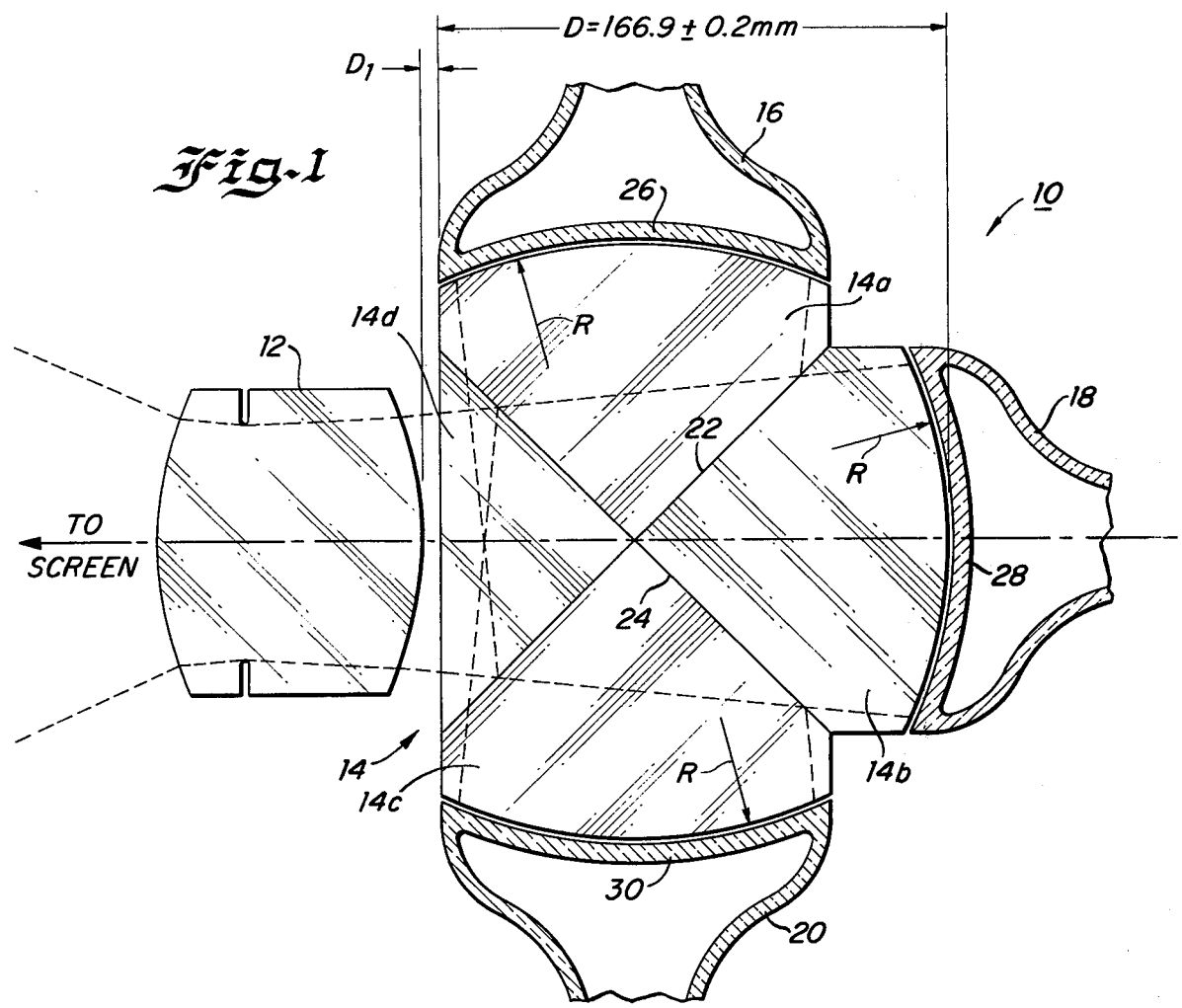
FIG. 1 is a diagram of the lens system according to the invention used in a color television projection system.

Referring now to the drawing, with particular attention to FIG. 1, there is shown a projection system according to the invention generally designated by the reference numeral 10. The projection system designated by the numeral 10 utilizes a single aspheric objective lens 12 and a beam splitter 14 that is optically coupled to three cathode ray tubes 16, 18 and 20, each having a concave face plate and a different color phosphor, for example, red, blue and green. The beam splitter 14 is of conventional design except for the three convex surfaces that mate with the concave surfaces of the cathode ray tubes 16, 18 and 20, and serves to combine the three images from the cathode ray tubes. The combining of the images is achieved by reflecting the images from the cathode ray tubes 16 and 20 from a pair of planar surfaces 22 and 24, respectively formed at the point of contact of four prisms 14a, 14b, 14c and 14d forming the beam splitter 14. The image from the cathode ray tube 18 passes through the surfaces 22 and 24 directly to the objective lens 12.

In accordance with an important aspect of the invention, each of the cathode ray tubes 16, 18 and 20 has a concave face plate 26, 28 and 30. The use of such a concave face plate reduces the constraints on the design of the objective lens 12, and by optimizing the radius of curvature of the concave face plates 26, 28 and 30, the objective lens can be fabricated from a single thick lens element having two aspheric surfaces, which in the present embodiment are two identical hyperbolic surfaces.

In the present embodiment, the cathode ray tubes 16, 18 and 20 are optically coupled to the beam splitter 14 in order to form an immersed system. The coupling is accomplished by bringing the cathode ray tubes 16, 18 and 20 into physical contact with the beam splitter 14 and placing the immersion medium at the interface between the cathode ray tubes 16, 18 and 20 and the beam splitter 14. Since the optical properties of the face plates 26, 28 and 30 are similar to those of the optical material forming the beam splitter 14, the interface between the beam splitter 14 and the face plates 26, 28 and 30 disappears in an immersed system, particularly when the optical coupling is achieved by the use of a viscous fluid or glue between the beam splitter 14 and the face plates 26, 28 and 30. However, the system need not be an immersed system and the system can be made to work satisfactorily by simply bringing the face plates 26, 28 and 30 into close proximity or contact with the beam splitter 14 without the use of an immersion medium. The only disadvantage that occurs when this is done is a slight reduction in transmission efficiency due to reflections at the interface between the cathode ray tube face plates 26, 28 and 30 and the beam splitter 14.

The use of curved images permits the design of the objective lens to be greatly simplified, and in the present embodiment, the objective lens is formed from a single aspheric lens 12, whose design has been so simplified by the use of concave images that the lens can be fabricated with two identical hyperbolic surfaces. In the specific embodiment illustrated in the drawing, the optical system according to the invention is used to project images from three five-inch diagonal measure cathode ray tubes onto a screen ranging from 52-inch diagonal measure to 72-inch diagonal measure. The distance between the objective lens and the screen ranges nominally from 62 to 83 inches. In the illustrated system, the lens and prisms are fabricated from optical acrylic, poly(methyl methacrylite) having a refractive index, $N_D$, of 1.490 and an Abbe number, $V_D$, of 57.8; however, any suitable optical material including various glasses or plastics may be used. The particular design illustrated in the drawing has a speed corresponding to F/1.8 and a focal length of 5.53 inches. In the aforesaid design, the radius of curvature, R, of the cathode ray tube face plate, and beam splitter entry surfaces and beam splitter optical path, D, are as follows for the green optical path:

$R = 144 \pm 3$ mm.

$D = 166.9 \pm 2$ mm.

The blue optical path is 1.6 mm. shorter, and the red optical path is 0.5 mm. longer. The radii of curvature, $R_1$ and $R_2$, of the objective lens are:

$R_1 = -R_2 = 121.32$ mm.

Figure 2:
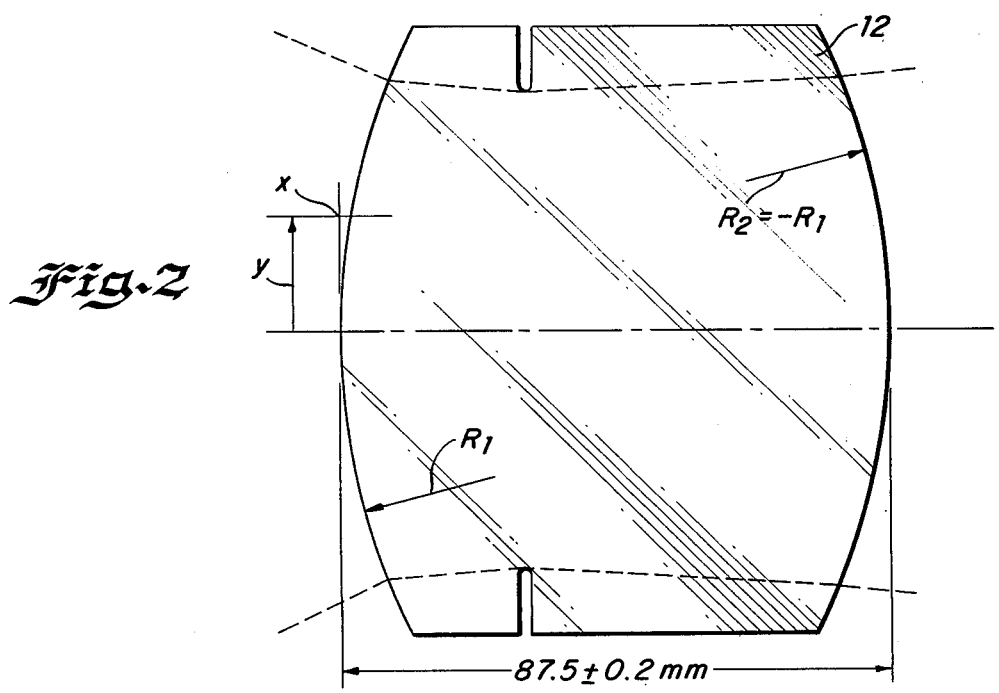
FIG. 2 is a more detailed diagram of the objective lens of the system.

Prior to aspherizing, with the actual hyperbolic surface of the left-hand surface of the lens (FIG. 2) being defined by:

$$x = \frac{R_1 - \sqrt{R_1^2 - (K+1)y^2}}{(K+1)}$$

where the aspheric constant K equals $-2.148$ and y ranges from 0 to at least 42 mm. A similar equation defining the right-hand surface of the lens is obtained by replacing $R_1$ with $-R_2$. An aperture stop in the form of a slot having an inside diameter of $78.6 \pm 0.555$ mm. is cut in the objective lens at a distance of $29.4 \pm 0.5$ mm. from the projecting surface. The distance $D_1$ (FIG. 1) between the objective lens 12 and the beam splitter 14, is variable and depends on the distance to the projection screen and the image size. Typical values for $D_1$ are:

| Screen Diagonal | Distance to Screen | $D_1$ |
|---|---|---|
| 72" | 83.2" | 5.08 mm. |
| 60" | 70.7" | 7.03 mm. |
| 52" | 61.8" | 8.84 mm. |

The aforesaid parameters may be renormalized to accomodate various refractive indices, focal lengths and tube sizes, with all radii, thicknesses and spaces being made proportionately larger to accomodate higher refractive indices, larger cathode ray tubes and longer focal lengths, and proportionately smaller to accomodate lower refractive indices, smaller cathode ray tubes and shorter focal lengths. The asphericity constant K is not affected by normalization.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A lens system usable for projecting an image disposed on a concave surface having a predetermined radius of curvature onto a screen, comprising:
   a prism having a flat surface and a convex surface having a predetermined radius of curvature substantially similar to the radius of curvature of the concave image surface, said convex surface being disposed adjacent to said concave image surface; and
   a single element objective lens having at least one aspheric surface, said objective lens being disposed adjacent to said flat surface of said prism and spaced therefrom.

2. A lens system as recited in claim 1 wherein said aspheric surface is hyperbolic.

3. A lens system as recited in claim 1 wherein said objective lens has a second aspheric surface.

4. A lens system as recited in claim 3 wherein said aspheric surfaces are hyperbolic.

5. A lens system as recited in claim 4 wherein said objective lens is symmetrical.

6. A lens system as recited in claim 1 wherein said image is disposed on a cathode ray tube having a concave face plate.

7. A lens system as recited in claim 6 wherein said cathode ray tube is optically coupled to said prism by means of a viscous immersing liquid having an index of refraction substantially similar to the index of refraction of said prism and the index of refraction of said face plate.

8. A lens system as recited in claim 6 wherein said prism is fabricated from a plurality of prismatic sections forming a beam splitter for combining a plurality of images disposed on a plurality of concave surfaces into a single image, said beam splitter having a plurality of convex surfaces each disposed adjacent to one of said concave surfaces.

9. A lens system as recited in claim 8 wherein each of said concave surfaces is a surface of a cathode ray tube.

10. A lens system as recited in claim 9 wherein the number of said concave surfaces is three.

11. A lens system comprising a single element objective lens having at least one aspheric surface, a concave image plane when viewed from the objective lens, and means for optically coupling said objective element to said image plane, wherein said objective lens is symmetrical and has two hyperbolic surfaces and said concave image plane has a radius of curvature of approximately 144 mm., said objective lens being fabricated with hyperbolic surfaces having a radius of curvature of approximately 121.32 mm., an asphericity constant K of approximately $-2.148$ and a thickness of approximately 87.5 mm., said radii and thicknesses being normalized for an index of refraction, $N_D$, of approximately 1.490 and a focal length of approximately 5.53 inches, and for use with a nominal image size of 5 inches diagonal measure at the concave image plane, and wherein said radii and thicknesses can be renormalized by proportionally adjusting all radii and thicknesses for other indices of refraction, focal length and image sizes.

12. A lens system as recited in claim 11 further including a beam splitter interposed between said concave image plane and said objective lens, said beam splitter having at least one convex surface having a radius of curvature substantially similar to the radius of curvature of said image plane disposed at said concave image plane and a flat surface disposed adjacent to and spaced from said objective lens.

13. A lens system as recited in claim 12 wherein said beam splitter includes second and third convex surfaces disposed at second and third concave image planes, respectively.

14. A lens system usable for projecting color television pictures onto a screen comprising:
   first, second and third cathode ray tubes each having a concave face plate of a predetermined curvature;
   an optical beam splitter having three convex surfaces of a predetermined curvature substantially similar to the curvature of said face plates, each of said convex surfaces being disposed adjacent to one of said face plates; and a single element objective lens having at least one aspheric surface disposed adjacent to said beam splitter and spaced therefrom.

15. A lens system as recited in claim 14 wherein said objective lens is symmetrical and has two hyperbolic surfaces.

16. A lens system as recited in claim 15 wherein said hyperbolic surfaces have a radius of curvature of approximately 121.32 mm., an asphericity constant K of approximately −2.148 and a thickness of approximately 87.5 mm., and wherein the radius of curvature of said concave face plates and said convex surfaces of said beam splitter have a radius of curvature of approximately 144 mm., said radii and thicknesses being normalized for the index of refraction, $N_D$, of approximately 1.490, for a focal length of approximately 5.53 inches and for use with cathode ray tubes having a nominal face plate size of 5 inches diagonal measurement, and wherein said radii and thicknesses can be renormalized to other indices of refraction, cathode ray tube sizes and focal lengths by proportionally adjusting all radii and thicknesses for other indices of refraction, focal lengths and cathode ray tube sizes.

17. A lens system as recited in claim 16 wherein at least one of said objective lens and said beam splitter is fabricated from acrylic lastic.

* * * * *